United States Patent
Venkatesh et al.

(10) Patent No.: US 6,397,292 B1
(45) Date of Patent: May 28, 2002

(54) ASYMMETRICAL STRIPING OF MIRRORED STORAGE DEVICE ARRAYS AND CONCURRENT ACCESS TO EVEN TRACKS IN THE FIRST ARRAY AND ODD TRACKS IN THE SECOND ARRAY TO IMPROVE DATA ACCESS PERFORMANCE

(75) Inventors: Dinesh Venkatesh, North Andover; Wayne W. Duso, Newton, both of MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/377,581

(22) Filed: Aug. 19, 1999

(51) Int. Cl.[7] .............................................. G06F 11/20
(52) U.S. Cl. ............................ 711/114; 711/113; 714/6
(58) Field of Search ................................... 711/114, 113, 711/112, 162; 714/6

(56) References Cited

U.S. PATENT DOCUMENTS

| 5,155,845 A | 10/1992 | Beal et al. | 395/575 |
| 5,206,939 A | 4/1993 | Yanai et al. | 395/400 |
| 5,263,145 A | 11/1993 | Brady et al. | 395/425 |
| 5,269,011 A | 12/1993 | Yanai et al. | 395/425 |

(List continued on next page.)

FOREIGN PATENT DOCUMENTS

| EP | 0 697 660 A1 | 2/1996 | G06F/11/20 |
| JP | 2-32419 | 2/1990 | G06F/31/06 |

OTHER PUBLICATIONS

Paul Massiglia, "The Raid Book" A Storage System Technology Handbook, 6th Edition, The Raid Advisory Board, Inc pp 46–51, 92–97, and 151–157, 1997.*

"Introduction to Redundant Arrays of Inexpensive Disks (RAID)" by David A. Patterson, Peter Chen, Garth Gibson and Randy H. Katz, pp. 112–117, 1989, IEEE.

"Disk System Architectures for High Performance Computing" by Randy H. Katz, Garth A. Gibson, and David A. Patterson, pp. 1–24, 1989, Computer Science Division (EECS) Univ. of California Berkeley, Report No. UCB/CSD 89/497.

A Case for Redundant Arrays of Inexpensive Disks (RAID), David A. Patterson, Garth Gibson, and Randy H. Katz, pp. 1–24, 1987, Computer Science Division (EECS), Univ. of California Berkely, Report No. UCB/CSD 87/391.

"Parity Striping of Disc Arrays: Low–Cost Reliable Storage with Acceptable Throughput" by Jim Gray, Bob Horst and Mark Walker, pp. 1–24, Tandem Computers Technical Report 90.2, 1990.

*Primary Examiner*—Hong Kim
(74) *Attorney, Agent, or Firm*—Howrey Simon Arnold & White, LLP

(57) ABSTRACT

Mirrored data is contained in a first data storage device array and also in a second data storage device array. However, devices in the first array are not simply mirrors of devices in the second array. Instead, each data storage device in the second array contains a respective share of the mirrored data contained in each data storage device in the first array, and each data storage device in the first array contains a respective share of the mirrored data contained in each data storage device in the second array. Therefore, when a data storage device in one array fails, the failure load is spread over the data storage devices of the other array. For disk storage devices, the mirrored data can be arranged in the first and second arrays so that the mirrored data is contained at the same disk track radius in both arrays in order to equalize seek time for write access or sequential read access to both arrays. Alternatively, the mirrored data can be arranged so that mirrored data at the minimum and maximum track radius in one array is contained at the mean track radius of the other array in order to minimize seek time for random read access.

11 Claims, 8 Drawing Sheets

U.S. PATENT DOCUMENTS

| | | | |
|---|---|---|---|
| 5,611,069 A | 3/1997 | Matoba | 395/441 |
| 5,742,792 A | 4/1998 | Yanai et al. | 395/489 |
| 5,812,753 A | 9/1998 | Chiariotti | 395/182.04 |
| 5,892,915 A | 4/1999 | Duso et al. | 395/200.49 |
| 5,893,140 A | 4/1999 | Vahalia et al. | 711/118 |
| 6,041,366 A * | 3/2000 | Maddalozzo, Jr. et al. | 710/5 |
| 6,076,143 A * | 6/2000 | Blumenau | 711/114 |
| 6,098,119 A * | 8/2000 | Surugucchi et al. | 710/10 |
| 6,115,788 A * | 9/2000 | Thowe | 711/114 |

* cited by examiner

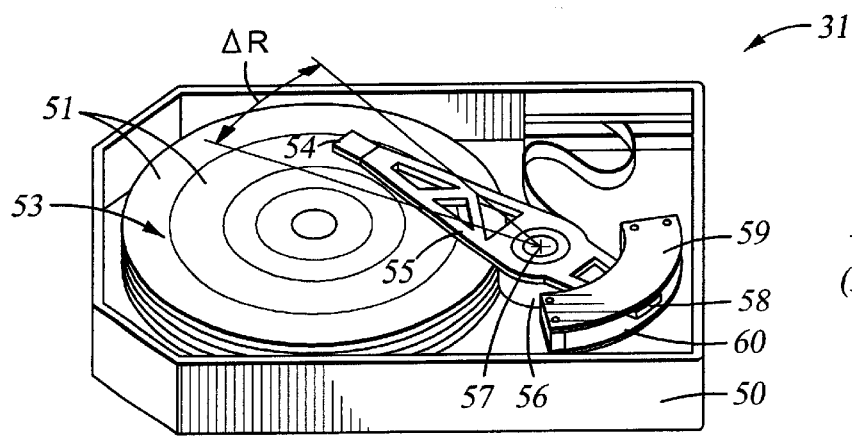
Fig. 2
(PRIOR ART)
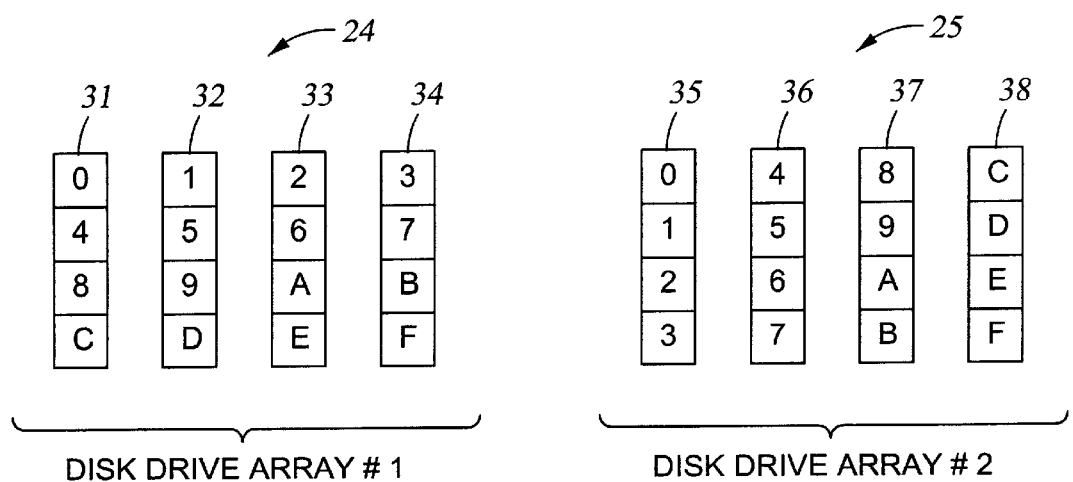
Fig. 3A
Fig. 3B
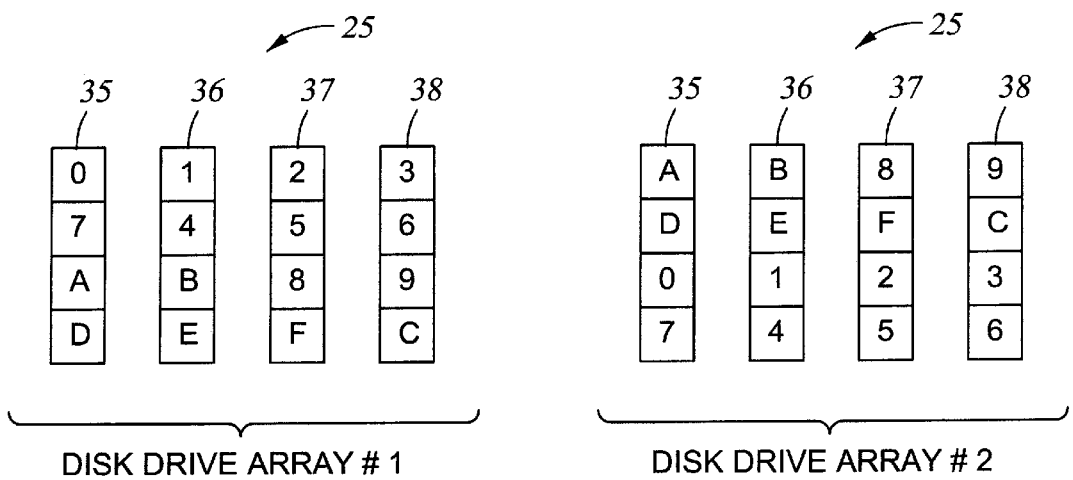
Fig. 4
Fig. 5

ASYMMETRICAL STRIPING OF MIRRORED STORAGE DEVICE ARRAYS AND CONCURRENT ACCESS TO EVEN TRACKS IN THE FIRST ARRAY AND ODD TRACKS IN THE SECOND ARRAY TO IMPROVE DATA ACCESS PERFORMANCE

BACKGROUND OF THE INVENTION

1. Field of the Invention

The present invention relates generally to data storage systems employing mirrored data storage for redundancy and improved access speed.

2. Description of the Related Art

The ever-increasing speed of central processing units has created an increasing demand for high-speed, high-capacity data storage. Fortunately, improvements in data storage and cache memory technology have kept pace with the improvements in central processor technology. Users, however, are also demanding a higher degree of reliability and availability of data storage access.

Redundant data storage is a common technique for providing a desired degree of reliability and availability of data storage access. Currently for most applications the preferred data storage technology is magnetic disk technology that has been developed for the personal computer market. A sufficient number of commodity magnetic disk drives are organized in an array and interfaced to a storage controller and semiconductor cache memory to provide sufficient capacity and data storage access speed for general-purpose computing and database applications. Redundant arrays of such inexpensive disks, known as "RAID," can provide a high degree of reliability and availability of data storage access.

The least complex method of providing redundancy in an array of storage devices is to double the number of storage devices so that the storage devices are organized in pairs, and data on the each storage device in each pair is a copy or mirror image of data on the other storage device in each pair. If a storage device fails, then the data processing system can access the redundant copy until the failed storage device is replaced.

The mirroring approach is compared and contrasted with more complex redundancy schemes in Patterson et al., "Introduction to Redundant Arrays of Inexpensive Disks (RAID)," COMPCON 89 Proceedings, Feb. 27–Mar. 3, 1989, IEEE Computer Society pp. 112–117. Mirrored RAIDs have the highest cost for a given storage capacity, but performance versus a nonredundant disk array depends on the mix of reads and writes. The user must double the number of disks for the same amount of data or, conversely, use only half the real storage capacity of the disks. If the arms and spindles of a pair were synchronized, then the performance of mirroring versus nonredundant disks would be the same. This is not commonly how the mirroring is implemented, and a write results in independent writes to two disks. The writes can be overlapped, but in general one will have longer seek and/or rotational delay. On the other hand, the independence of the disks can improve performance of reads. The system might look at the pair of disks that have the data; if only one is busy, it chooses the other. If both are idle, it picks the disk that has shortest seek.

More complex RAID techniques reduce the number of disks by computing and storing parity of data across a number of disks. Failure of a disk can be detected by a disk controller, and data of a failed disk can be computed using the parity. By calculating and storing parity of a group of disks on a bit per disk basis, for example, any single disk failure can be corrected simply by reading the rest of the disks in the group to determine what bit value on the failed disk would give the proper parity. Such a N+1 RAID scheme can lose data only if there is a second failure in the group before the failed drive is replaced. This scheme has much lower cost and overhead, with the customer deciding how much overhead he wants to pay by increasing the number of disks in the parity group. Performance depends not only on the mix of reads and writes, but also on the size of the access. Since there is ECC information on each sector, read performance is essentially the same as non-redundant disk arrays. For "large" writes—writing to at least a sector to every disk in the parity group—the only performance hit is 1/N more writes to write the parity information. Writes to data on a single disk, on the other hand, require four disk accesses, including a read and a write to the parity information. To avoid a bottleneck that would be caused by the additional access to the parity information, the parity is spread over several disks. (Patterson et al., p. 113.)

SUMMARY OF THE INVENTION

The inventors have recognized that the conventional mirroring of data storage devices has a failure load problem. For continuous throughput, data is often striped over more than one pair of mirrored disk drives, and the disk drives are accessed substantially simultaneously for continuous throughput. If the disk drives were mirrored in pairs, a failed disk drive would become a bottleneck to simultaneous access.

This failure load problem is solved by an asymmetrical striping of the mirrored data over the mirrored arrays of data storage devices so that the mirrored data contained in a failed storage device in one of the arrays can be accessed by accessing respective shares of this mirrored data in a plurality of the data storage devices in the other array. In addition, the asymmetrical striping reduces the so-called "rebuild" time for copying this mirrored data to a replacement for the failed storage device. The mirrored data can be copied to the failed data storage device from more than one other data storage device without substantial interruption of any continuous throughput.

For disk storage devices, the mirrored data can be arranged in the first and second arrays so that the mirrored data is contained at the same disk track radius in both arrays in order to equalize seek time for write access or sequential read access to both arrays. Alternatively, the mirrored data can be arranged so that mirrored data at the minimum and maximum track radius in one array is contained at the mean track radius of the other array in order to minimize seek time for random read access.

In accordance with yet another aspect, the invention provides a data storage system including a first array of data storage devices, a second array of data storage devices, and a storage controller. The storage controller is coupled to the first array of storage devices and the second array of storage devices for accessing mirrored data contained in the first array of data storage devices and also contained in the second array of data storage devices. The storage controller is programmed to respond to a request to access a specified portion of the mirrored data by accessing the specified portion of the mirrored data in the first array of data storage devices when the specified portion of the mirrored data cannot be accessed in the second array of data storage devices, and by accessing the specified portion of the mirrored data in the second array of data storage devices when the specified portion of the mirrored data cannot be accessed in the first array of data storage devices. Each data storage device in the first array of data storage devices contains a respective share of the mirrored data. Each data storage device in the second array of data storage devices contains a respective share of the mirrored data. Each data storage device in the second array of data storage devices contains a respective share of the mirrored data contained in each data storage device in the first array of data storage devices. Moreover, each data storage device in the first array of data storage devices contains a respective share of the mirrored data contained in each data storage device in the second array of data storage devices.

In accordance with still another aspect of the invention, the mirrored data contained in the first array of data storage devices and also contained in the second array of data storage devices is subdivided into respective data blocks. Each data storage device in the first array of data storage devices contains the same number of the data blocks so that the data blocks are cells in a first matrix. Each data storage device in the second array of data storage devices contains the same number of the data blocks so that the data blocks are cells in a second matrix, and the second matrix is the transpose of the first matrix.

In a preferred implementation, the data storage devices in the first and second arrays of data storage devices contain rotating disks, and the mirrored data is contained at different radii on the rotating disks. Each of the data blocks contained in each of the data storage devices is contained at radii over a respective range of radii on each of the data storage devices. The data blocks in each row of the first matrix are contained in the data storage devices in the first array of data storage devices at the same range of radii. Moreover, the data blocks in each row of the second matrix are contained in the data storage devices in the second array of data storage devices at the same range of radii.

In a preferred implementation, the data storage devices in the first and second arrays of data storage devices contain rotating disks, and the mirrored data is stored in even and odd numbered circular tracks on planar surfaces of the rotating disks. The storage controller is further programmed for a read access to the specified portion of the mirrored data by issuing a read command to one of the data storage devices in the first array of data storage devices for reading one half of the specified portion of the mirrored data from odd numbered tracks and by issuing a read command to one of the data storage devices in the second array of data storage devices for concurrently reading another half of the specified portion of the mirrored data from even numbered tracks.

BRIEF DESCRIPTION OF THE DRAWINGS

Other objects and advantages of the invention will become apparent upon reading the following detailed description with reference to the accompanying drawings wherein:

FIG. 2 is a perspective view of a prior-art disk drive;

FIG. 3A and FIG. 3B show one method of mirroring the disk arrays of FIG. 1 in accordance with the invention;

FIG. 4 shows a first alternative configuration for mirroring of data in the second disk array of FIG. 1 in order to reduce seek time for write operations;

FIG. 5 shows a second alternative configuration for mirroring of data in the second disk array of FIG. 1 in order to reduce seek time for short read operations;

Figure 1:
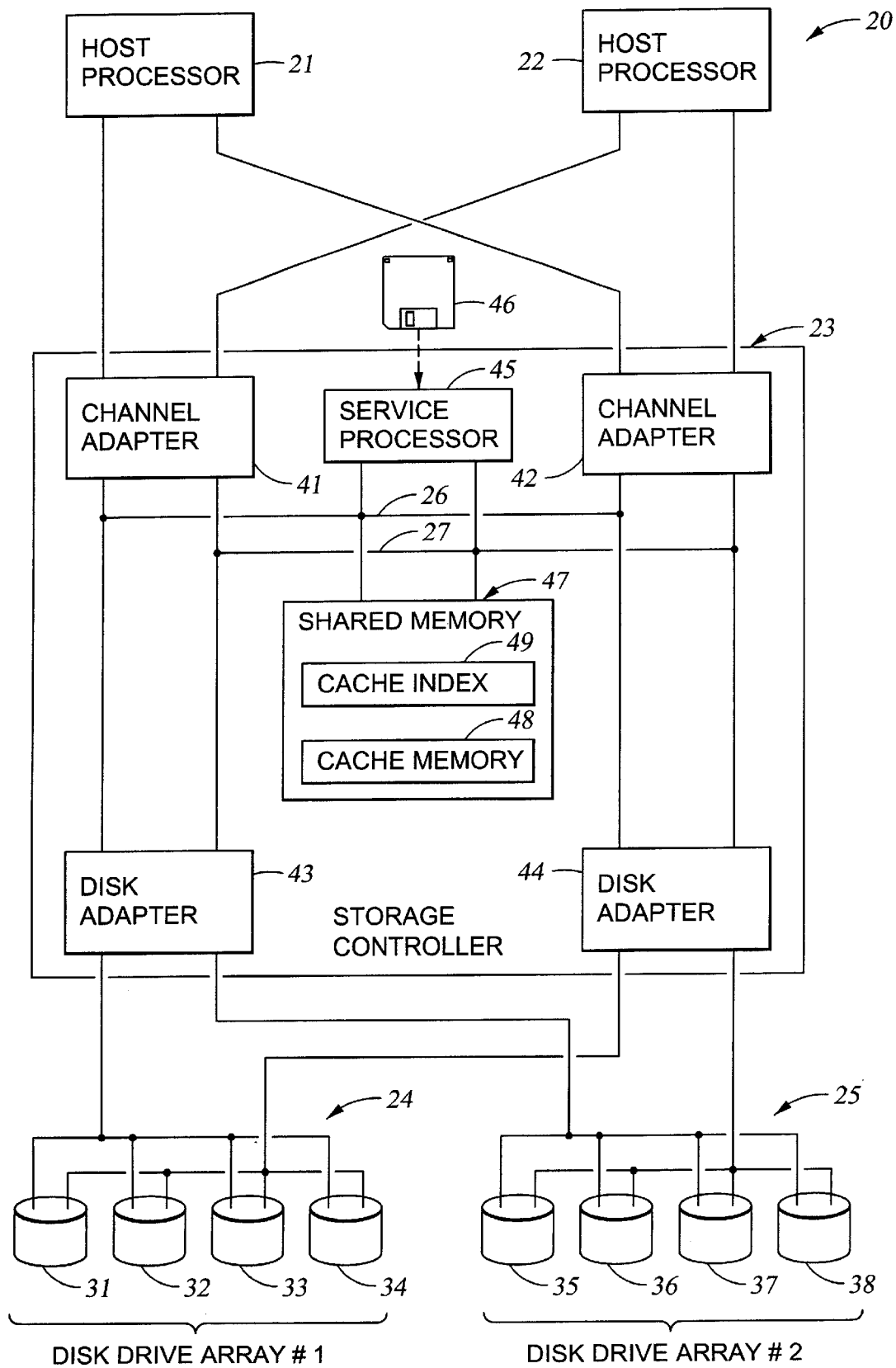
FIG. 1 is a block diagram of a data processing system including a storage controller and disk arrays that are mirrored in accordance with the invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

Turning now to FIG. 1 of the drawings, there is shown a block diagram of a data processing system 20 including two host processors 21, 22, a storage controller 23, and disk arrays 24, 25. The disk arrays are mirrored so that the second disk array 25 contains a copy of the data in the first disk array 24.

As discussed above, it is known to mirror disk drives to provide redundant data storage. In the data processing system of FIG. 1, however, none of the disk drives 31, 32, 33, 34 in the first disk array 24 is a mirror of any of the disk drives 35, 36, 37, and 38 in the second disk array 25. Moreover, the storage controller 23 is programmed to define the mirrored relationship between the disk arrays 24 and 25, and to obtain performance improvements during data access to the disk drives under normal and certain abnormal conditions.

As shown in FIG. 1, the storage controller 23 has dual redundant data paths 26, 27 and multiple redundant programmed processors in order to continue disk access operations in the event of a failure of any single data path or processor. The redundant processors include channel adapters 41 and 42, which interface each of the host processors 21 and 22 to the storage controller 23, and disk adapters 43, 44, which interface the storage controller to each of the disk arrays 24, 25. Each of the channel adapters 41, 42 and the disk adapters 43, 44 share access to a dual-port high-speed random access semiconductor memory 47. The shared memory 47 provides a cache memory 48 and cache index 49 to reduce loading on the disk arrays 24, 25 when the host processors 21, 22 make repeated accesses to the same logical data tracks. The shared memory 47 is also used for communicating messages and status information among the processors in the storage controller 23.

The storage controller 23 includes a service processor 45, which provides a user interface to a system administrator (not shown). The system administrator can program and view the configuration and attributes of the disk drives in the disk arrays 24, 25. The service processor 45 alerts the system administrator to any failure of the disk drives. The system administrator can also reprogram the channel adapters 41, 42 and disk adapters 43, 44 by causing the service processor to read the new program from a program storage device such as a removable magnetic disk 46. For example, the data processing system of FIG. 1 can be made by loading a new program into the storage controller of a conventional cached disk array storage system such as a Symmetrix (Trademark) cached disk array manufactured by EMC Corporation, 171 South Street, Hopkinton, Mass., 01748-9103. Further details of the Symmetrix (Trademark) cached disk array are disclosed in Yanai et al. U.S. Pat. No. 5,206,939 issued Apr. 27, 1993, entitled "System and Method for Disk Mapping and Data Retrieval," incorporated herein by reference, and Yanai et al. U.S. Pat. No. 5,269,011 issued Dec. 7, 1993, entitled "Dynamically Reconfigurable Data Storage System Controllers Selectively Operable as Channel Adapters or Storage Device Adapters," incorporated herein by reference.

The Symmetrix (Trademark) cached disk array can also be configured for use as a network file server or as a video file server. For example, Vahalia et al. U.S. Pat. No. 5,893,140 issued Apr. 6, 1999, incorporated herein by reference, describes a cached disk array in a network file server. Duso et al., U.S. Pat. No. 5,892,915 issued Apr. 6, 1999, incorporated herein by reference, describes a cached disk array in a video file server. In either application, the mirroring of the disk arrays in accordance with the present invention can improve performance under certain access and loading conditions. The local mirroring of disk arrays in accordance with the present invention can also be employed in a storage system that uses remote mirroring for disaster recovery. For example, Yanai et al. U.S. Pat. No. 5,742,792 issued Apr. 21, 1998, incorporated herein by reference, describes a pair of cached disk arrays using remote mirroring.

The present invention can provide enhanced data access performance due to certain characteristics of commodity disk drives. Commodity disk drives have a data throughput that is much smaller than the rate at which data can be transferred from semiconductor cache memory to a host processor. Consequently, a disk drive failure in a conventional mirrored storage array can cause a drop of nearly 50% in continuous data throughput. Other storage devices, such as optical disk drives solid-state disks, share these characteristics and can also be used to practice the present invention.

Magnetic and optical disk drives also have the disadvantage of a variable delay between the time that a disk drive receives a data access command and the time that the disk drive can begin to access data on the disk. This delay is due to the time required to seek out a track and to synchronize to the data on the track. FIG. 2, for example, shows a conventional commodity disk drive 31 with a cover (not shown) removed from a die-cast frame 50 of the disk drive. Data is stored on circular tracks 51 on planar surfaces of stacked disks 53. For example, the stack 53 includes five disks providing ten data recording surfaces. Each of the recording surfaces is scanned by a respective magnetic transducer 54 mounted on a respective beam 55 of a common arm 56. The arm 56 swings about a pivot 57 extending from the frame 50. The end of the arm 56 opposite from the stack of disks 53 carries a wire coil 58 placed between two stationary arcuate magnets 59, 60 mounted to the frame 51. The coil 58 is energized with electrical current to apply a torque to the arm 56 about the pivot 57. The polarity of the electrical current is selected to move the magnetic transducer 54 either toward or away from the central axis of the disks 53. In this fashion, the arm 56 is swung about the pivot 57 to seek out a set of tracks at a selected radius within a certain range ΔR.

Figure 11A:
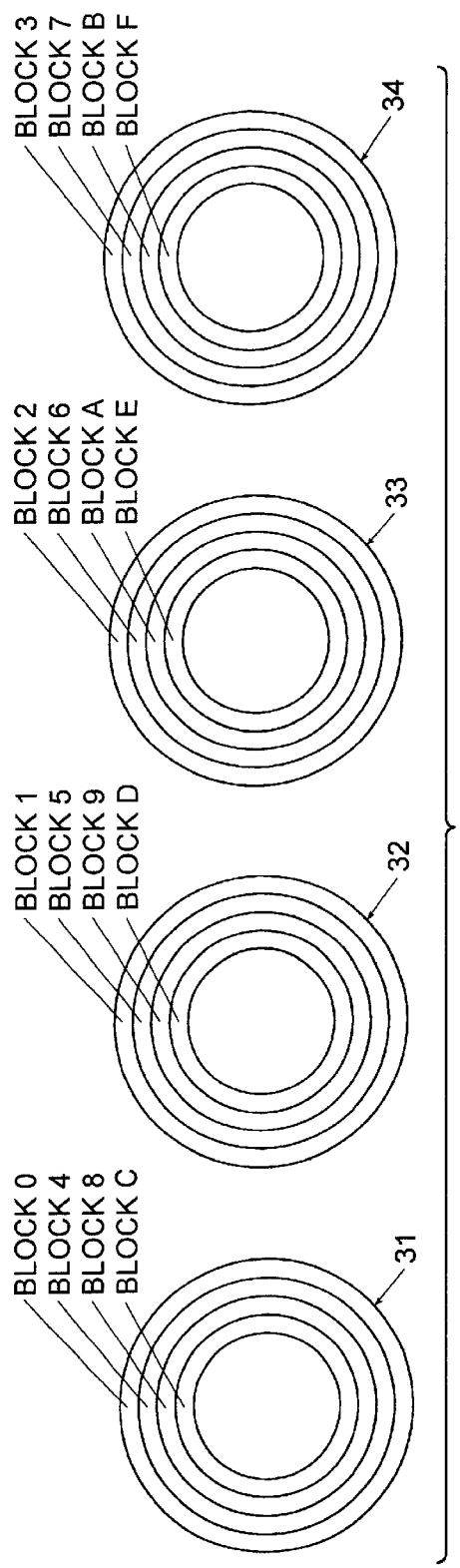
FIG. 11A and FIG. 11B correspond to FIGS. 3A and 3B, respectively, and show placement of data blocks at radial positions in the disk arrays of FIG. 1.

FIG. 3A shows a matrix representing an organization of data stored in the first disk array 24. (FIG. 11A shows a corresponding placement of the data at radial positions with respect to the disk drives in the first disk array.) Each column in the matrix represents a respective one of the disk drives 31, 32, 33, and 34. Each cell in the matrix represents a block of data residing in a respective one of the disk drives 31, 32, 33, 34. The data blocks are labeled 0, 1, 2, 3, 4, 5, 6, 7, 8, 9, A, B, C, D, E, F, where the label represents the respective data stored in each cell. The rows are ordered with respect to track radius. For example, data in the top row in the matrix is stored at a relatively large track radius, and the data in the bottom row in the matrix is stored at a relatively small track radius.

Figure 11B:
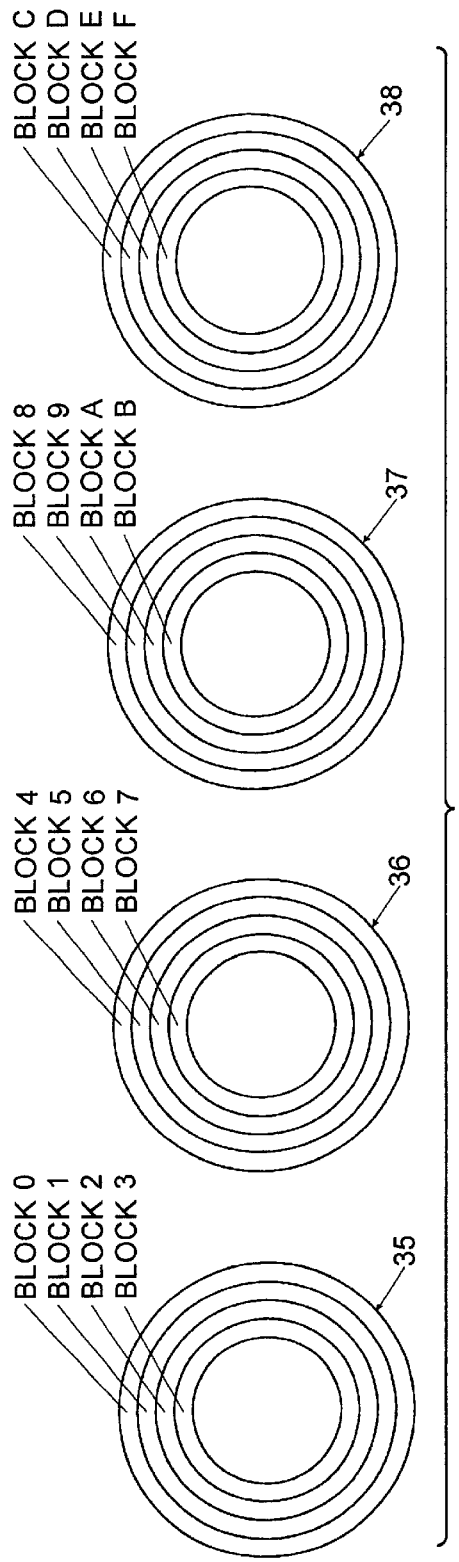

FIG. 3B shows a matrix representing an organization of data stored in the second disk array 25. (FIG. 11B shows a corresponding placement of the data at radial positions with respect to the disk drives in the second disk array.) Each column in the matrix represents a respective one of the disk drives 35, 36, 37, and 38. Each cell in the matrix represents a respective one of the blocks of data that is also contained in the first disk array 24 of FIG. 3A. All of the data blocks contained in the second disk array 25 are contained in the first disk array 24, so that the data of the first disk array is mirrored in the second disk array 25. However, the data-block matrix of FIG. 3B is the transpose of the data-block matrix of FIG. 3A. This transpose relationship ensures that each disk drive in the second disk array shares one and only one data block with each disk drive in the first disk array. The data blocks in each disk drive in the first disk array are distributed over all of the disk drives in the second disk array. Conversely, the data blocks in each disk drive in the second disk array are distributed over all of the disk drives in the first disk array.

The sharing of only 25% of the data blocks between each disk drive of the first disk array and each disk drive of the second disk array reduces a bottleneck that occurs when one of the disk drives fail. For example, if pairs of disk drives were mirrored, and read accesses were focused on mirrored data in one pair of the disk drives, then the throughput would decrease by 50%. Moreover, in many applications, such as continuous media or data backup, the data is striped over more than one pair of disk drives and the disk drives are accessed substantially simultaneously for continuous throughput. Under these conditions, the failed disk drive would become a bottleneck to simultaneous access so that the throughput would still decrease by about 50%.

In the case of transposed mirrored arrays, as shown in FIGS. 3A and 3B, the load of a failed disk drive in one of the arrays is spread across the four disk drives in the other array. Therefore, the throughput would decrease no more than about 25%, or an improvement of 50% over symmetrical mirrored arrays. This analysis was confirmed by testing.

In the more general case of N disk drives in each array, and N data blocks in each disk drive, the transposed mirrored arrays will spread the failure load of one disk drive across the N disk drives in the other array, and the loss of throughput due to the failure of one disk drive will be only 1/N.

An additional benefit due to the fact that each disk drive shares only a fraction 1/N of the data in any one disk drive of the other mirrored array is that the so-called "rebuild" time for copying data to a replacement for the failed disk drive is reduced by about the same fraction 1/N.

The fact that each disk drive shares only a fraction 1/N of the data in any disk drive of the other mirrored array is unaffected by interchanging rows of the matrix for the first disk array or by interchanging the rows of the matrix of the second disk array. The interchanging of rows of either matrix, however, can affect the seek time of access to a data block in one disk array relative to the seek time of access to the same data block in the other disk array. The interchanging of the rows of either matrix can also affect the best strategy for streaming data into and out of either array. Therefore, certain data access conditions may favor alternative forms of asymmetrical mirrored arrays, even though all of these alternative forms have the same advantage that a failure of any one disk drive in one of the disk drive arrays causes the failure load to be shared by all of the disk drives in the other disk drive array.

Consider, for example, the loading of the disk drives for the transposed mirroring as shown in FIGS. 3A and 3B when the data blocks are accessed in the sequence block 1, block 2, block 3, ..., block E, block F. This sequence minimizes the loading on the first disk array 24 because the sequence is striped across the rows of the matrix shown in FIG. 3A, but it maximizes the loading on the second disk array 25 because the sequence is striped across the columns of the matrix in FIG. 3B. In other words, over a duration of time that is long compared to inexpensive buffer capabilities, the loading is shared among the disk drives in the first disk array 25, but the loading is concentrated on one or at most two of the disk drives in the second disk array 26. A diagonal access sequence of block 0, block 5, block A, block F, block 4, block 9, block E, block 3, block 8, block D, block 2, block 7, block C, block 1, block 6, block B has a minimum loading on the first disk array and a much reduced loading on the second disk array. However, the diagonal access sequence has some interruptions for rather long seek times when the arms of the disk drives must swing between a large and a small track radius.

FIG. 4 shows an alternative data organization for the second mirrored disk array 25. The data-block matrix in FIG. 4 for the second disk array 25 has rows containing the same data blocks as the same respective rows of the data-block matrix in FIG. 3A for the first disk array 24. Therefore the rank of the data blocks is preserved. However, in each row, the data blocks are rotated as a function of rank so that each disk drive in the second disk array 25 of FIG. 4 shares one and only one data block with each and every one of the disk drives in the first disk array 24 of FIG. 3A. Therefore, in a pair of mirrored disk arrays as shown in FIG. 3A and FIG. 4, the failure load of any one of the disk drives is shared among all of the disk drives in the other disk array. In addition, each of the disk arrays can be accessed in the sequence of block 0, block 1, block 2, ..., block E, block F, with a minimum loading on the first disk array, a small loading on the second disk array, and without interruption of sequential data access by a swinging of the disk arms over a wide range of track radius.

Use of the data-block matrices as shown in FIG. 3A and FIG. 4 tends to synchronize disk drive arm movements for read and write operations so that the data access time for write operations is generally minimized but the data access time for short read operations tends to be maximized. In this context, a short read operation refers to the reading of such a small amount of data that it is better to have only one disk drive perform the read operation rather than dividing the read operation between two disk drives that may each store a copy of the data to be read.

For data access to a read-only or a read-mostly data set, performance can be improved by interchanging rows of the data block matrix of FIG. 4 so that in many instances the seek time for read access to a data block in the second disk array is relatively short when the seek time for access to the same data block in the first disk array is relatively long, and conversely the seek time for data access to a data block in the second disk array is relatively long when the seek time for access to a data block in the first disk array is relatively short. For example, the data block matrix shown in FIG. 5 is obtained from the data block matrix of FIG. 4 by interchanging the second and last rows so that when there is a relatively long seek time for moving the disk drive arm between a block in any column and in the first row to a block in the same column and in the last row, the corresponding seek time between the data blocks in the second disk array can be relatively short. Conversely, when there is a relatively long seek time for moving the disk drive arm between a block in the first row of the data block matrix of FIG. 5 and a block in the last row for the same column in the matrix, the corresponding seek time between the blocks in the first disk array can be relatively short.

A comparison of the transpose data block matrix of FIG. 3B to the data block array of FIG. 5 shows that the transpose case has some of the same benefits for short read operations. For the transpose case, when the first disk array has a relatively long time between the blocks of short track radius and long track radius in the same disk drive, the two data blocks reside in different disks in the same relatively narrow range of disk radius. For the case where the second disk array uses the data block matrix of FIG. 5., the two data blocks reside in different disk drives, but not at the same narrow range of track radius. More importantly, the data blocks having the maximum and minimum track radius in the data block array of FIG. 3A have mean track radii in the data block matrix of FIG. 5, and conversely the data blocks having the maximum and minimum track radius in the data block array of FIG. 5 have mean track radii in the data block matrix of FIG. 3A. This suggests that the data block array of FIG. 5 would provide somewhat improved short read random access over the transpose data block array of FIG. 3B because from a random initial track radius, the average seek time to a track at a mean track radius will be shorter than the seek time to a track at the maximum or minimum track radius.

Figures 6A, 6B:
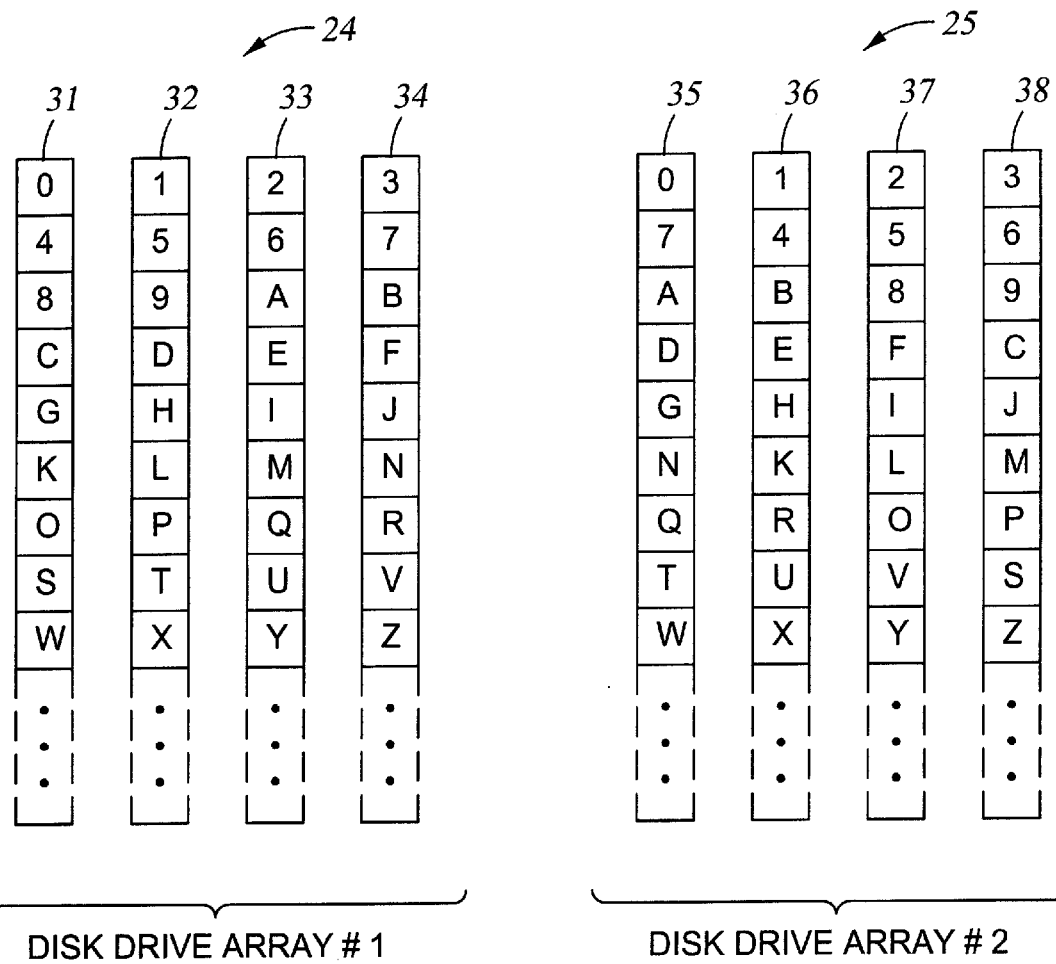
FIG. 6A and FIG. 6B show a third alternative configuration for mirroring the disk arrays of FIG. 1 in order to reduce loading for long read operations.

For the square data-block matrices in FIGS. 1A to FIG. 5, the number of data blocks per disk drive is the same as the number of disk drives in each of the first and second disk drive arrays. However, the present invention can be practiced using any desired multiplicity of disk blocks per disk drive. The use of a large number of data blocks in each disk drive is most important for an application such as continuous media or data backup where there is a need for continuous throughput. In this case it is desirable to use a relatively small data block size, for example all of the data residing in the tracks at the same track radius in one disk drive, and to sequentially stripe the data over all of the disk drives in each array. Therefore, the throughput can be maximized, for example, by reading odd-numbered data tracks from each disk drive in one of the disk arrays and simultaneously reading even-numbered data tracks from each disk drive in the other disk array as all the disk arms swing rather uniformly over a similar range of track radii. As shown in FIG. 6A and FIG. 6B, for example, the rotational technique of FIG. 4 can be used in 10 such a case to obtain all of the benefits discussed above for the rotational method of FIG. 4.

Figure 7:
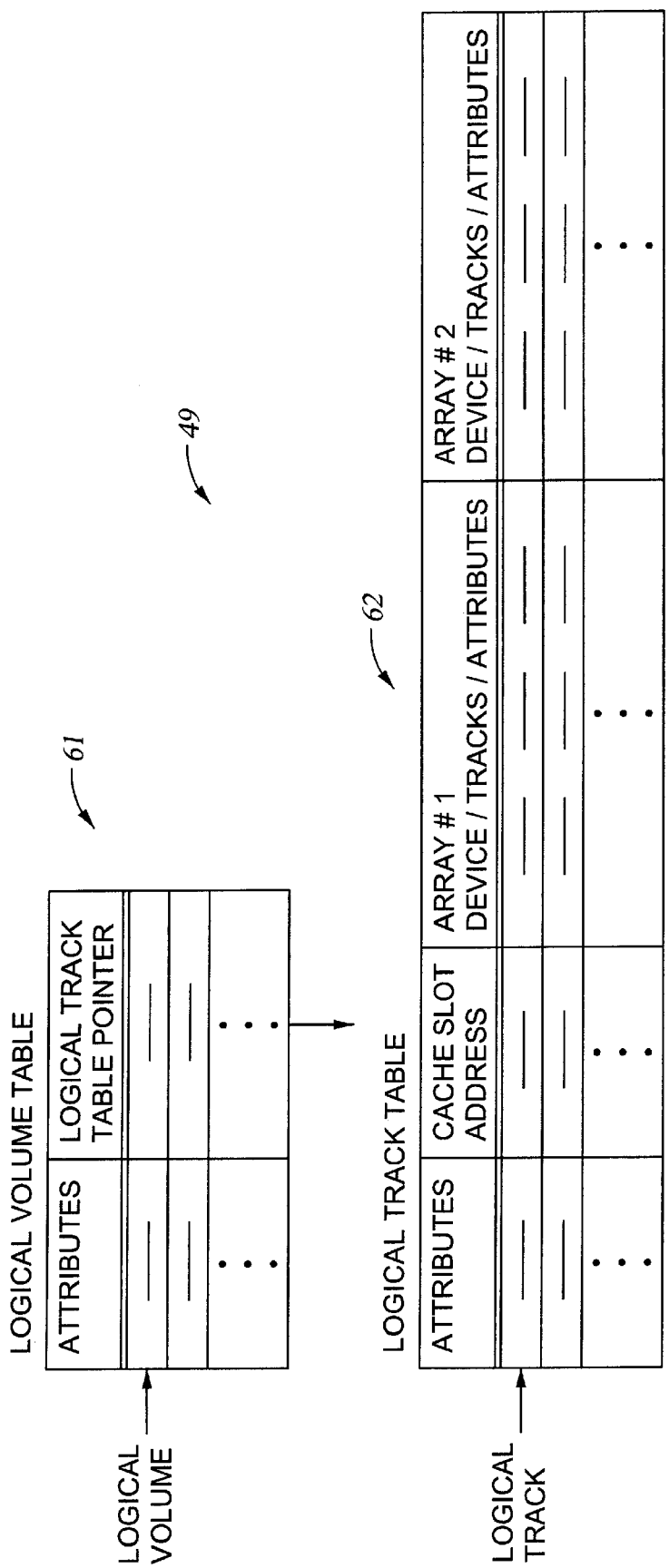
FIG. 7 is a block diagram of a cache index for the storage controller of FIG. 1.

FIG. 7 shows a block diagram of the cache index 49 for the storage controller of FIG. 1. In a conventional fashion, the cache index includes a logical volume table 61 and a logical track table 62. The cache index could include additional tables, such as cylinder tables, as further described in U.S. Pat. No. 5,206,939 cited above. The logical volume table includes attributes of the logical volumes of data in the storage system, and for each logical volume, a pointer to a logical track table for each logical volume. The logical track table 62 includes, for each logical track of the logical volume, attributes of the logical track, and a cache slot address for the logical track. In addition, the logical track table includes information specifying where the data of the logical track is stored in a disk drive in a first disk drive array and in a disk drive in a second disk drive that is mirrored with the first disk drive array. This information includes, for each of two mirrored disk drive arrays, a disk drive number that is unique to the disk drives in the storage system, an indication of the physical track or tracks in the disk drive, and attributes of the disk drive and the physical track or tracks.

The attributes of the storage device in the first array and the attributes for the device in the second storage array for each logical track can be similar to the attributes used in a remote mirroring system such as the system described in U.S. Pat. No. 5,742,792 cited above. In other words, the attributes can include a write-pending flag indicating whether a write for the logical track is pending from cache to the disk drive, a format-pending flag indicating whether a format operation is pending for the associated physical tracks of the disk drive, a flag indicating whether the associated physical tracks of the disk drive are invalid, a flag indicating whether the physical tracks of the disk drive are in a device pending state, for example, during a rebuild operation, and a flag indicating whether the physical tracks for the disk drive are either in a write-disabled state or a write-enabled state.

The cache index structure of FIG. 7 assumes that there is one and only one data block associated with each logical track although each data block may store the data of more than one of the logical tracks. The cache index includes all of the information needed about the disk drives for the channel adapters and disk adapters to respond to a data access command from a host processor. However, for performing a rebuild operation in response to a disk drive failure, additional indexing information is desirable to locate easily the data to be copied to the replacement disk drive and to update the cache index during the rebuild operation.

Figure 8:
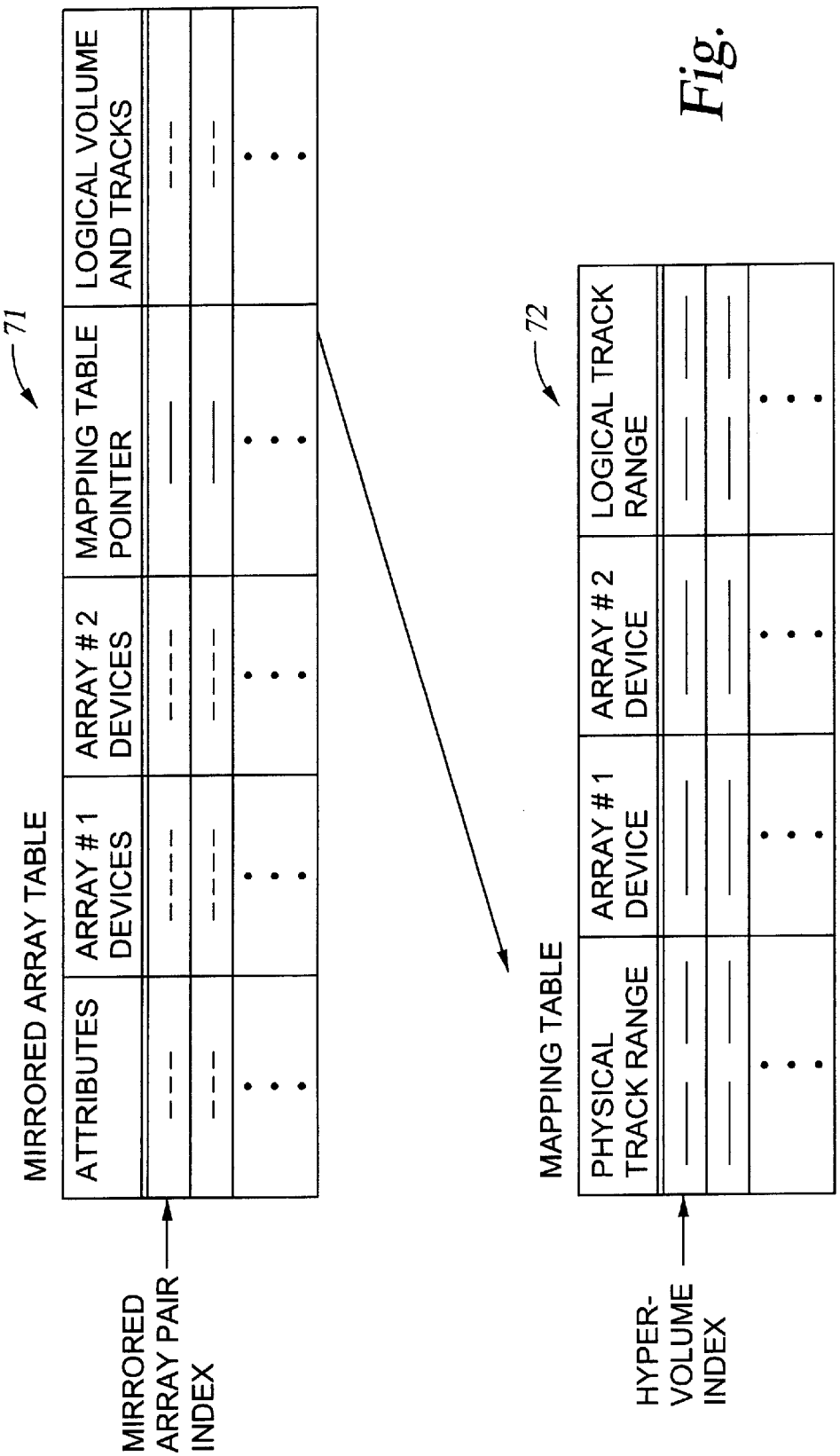
FIG. 8 is a block diagram of data structures for defining a mirrored relationship between the disk arrays in FIG. 1.

FIG. 8 shows a mirrored array table 71 linked to a mapping table 72 used during the rebuild operation. The mirrored array table 71 includes an entry for each pair of mirrored disk arrays. Each entry of the mirrored array table, for example, includes attributes of the mirrored disk array pair and in particular specifies the disk drives in a first array of the pair, the disk drives in a second array of the pair, a mapping table pointer which specifies additional information defining the mirroring of the data blocks in the mirrored disk array pair, and information specifying the logical volume and tracks associated with the mirrored disk array pair. For example, if a disk drive fails, the service processor can search the array number 1 devices column and the array number 2 devices column to locate the mirrored array pair including the failed disk drive. Then the service processor can obtain the mapping table pointer to discover additional information about the failed disk drive.

The mapping table 72 includes an entry for each row of the data block matrix in any one of FIG. 3A to FIG. 6B. The row index is more generally referred to as a hyper-volume index since a subset of a disk drive volume (corresponding to a data block in the examples above) is often called a hyper-volume. In any case, each entry of the mapping table 72 includes a physical track range, an identifier of a disk drive in the first disk drive array, an identifier of a disk drive in the second disk drive array, and a cache slot address range. For example, when the service processor is rebuilding data in a replacement for the failed disk drive, it searches either the array number 1 device column or the array number 2 device column to locate the device identifier of the failed disk drive. Upon finding the identifier of the failed disk drive, the service processor reads the mapping table 72 to obtain the logical track range corresponding to the failed disk drive. The service processor uses this track range to access the logical track table 62 of FIG. 7 to change the attributes of the failed disk drive for substitution of the replacement disk drive. The service processor also reads the mapping table 72 to obtain the identifiers of the corresponding disk drives in the other disk drive array in order to identify the devices from which data is copied to the replacement disk drive.

Figure 9:
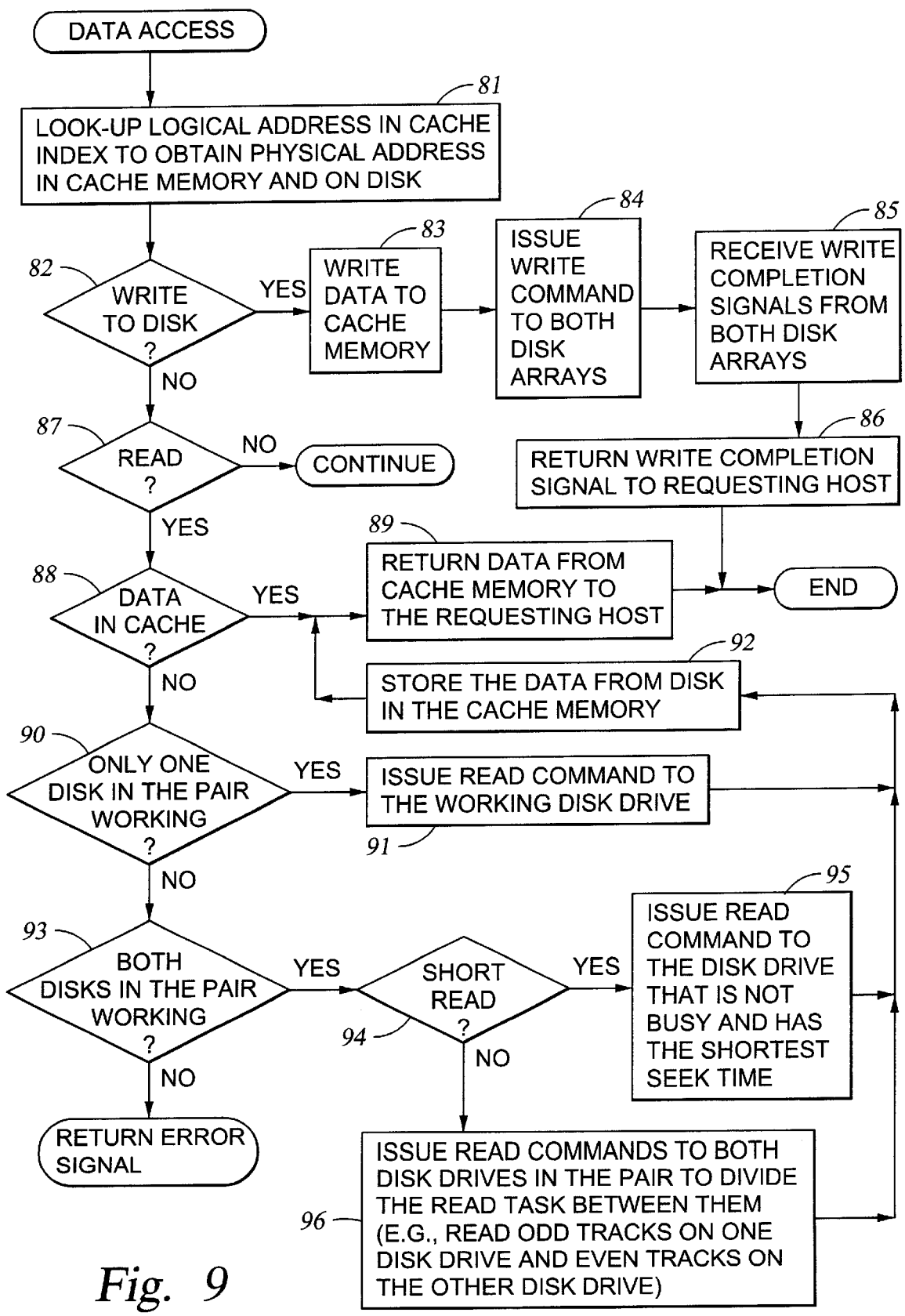
FIG. 9 is a flowchart of programming of the storage controller in FIG. 1 for access to the mirrored disk arrays.

Turning now to FIG. 9, there is shown a flow chart of programming for the storage controller (23 in FIG. 1) in order to process a data access request from a host processor. The data access request includes a logical address consisting of a logical volume identifier and a logical track number. In a first step 81, the storage controller looks up the logical address in the cache index to obtain any corresponding physical address in cache memory and in disk storage. Then in step 82, execution branches to step 83 if the data access request is a request for a write to disk. In step 83, the storage controller writes data from the host processor to a slot in the cache memory. Then in step 84, the storage controller issues a write command to both of the disk arrays in the mirrored disk array pair assigned for storage of the data having the logical volume and logical track specified by the host processor. Then in step 85 the storage controller waits until it receives write completion signals from both of the disk arrays in the mirrored array pair. Finally, in step 86 the storage controller returns the write completion signal to the requesting host processor, and the storage controller is done responding to the write request.

If in step 82 the data access request is something other than a write to disk, execution continues from step 82 to step 87. In step 87, execution branches to step 88 if the data access request is a read request. In step 88, execution branches to step 89 if the requested data is in the cache memory. If so, then execution branches from step 88 to step 89, where the storage controller returns data from the cache memory to the requesting host processor, and processing of the read command is done.

If the requested data is not in the cache, then execution continues from step 88 to step 90. In step 90, execution branches depending on whether only one disk in the pair of disks containing the desired data is working. The storage controller inspects the attributes of the array number 1 device and the array number 2 device for the desired logical track in the logical track table 62 of FIG. 7 in order to determine whether only one disk in the pair is working. If so, then execution branches from step 90 to step 91 to issue the read command to only the working disk drive. Once the working disk drive returns the desired data, then in step 92 the storage controller stores the data from disk in the cache memory. Execution then continues from step 92 to step 89 to return the data from the cache memory to the requesting host, and processing of the read request is done.

If in step 90 the storage controller does not find that only one disk in the pair is working, execution continues from step 90 to step 93. In step 93, execution branches depending on whether both disk in the pair are working. If not, none of the disk drives in the pair are working so that the storage controller must return an error signal to the requesting host processor. The storage controller also issues an alert via the service processor to the system administrator so that immediate attention will be directed to replacement of the failed disks. If both of the disks in the pair are working, execution continues from step 93 to step 94. In step 94, execution branches depending on whether the read request is a request for a short read operation. For example, the storage controller could be programmed to respond to read requests for one or more consecutive logical tracks. A request for no more than one logical track from one data block could be interpreted as a short read request, and a request for more than one logical track from one data block could be interpreted as a long read request.

For a short read request, execution branches from step 94 to step 95. In step 95, a read command is issued to the one of the two disk drives in the pair that is not busy, and if both of the disk drives are not busy, to the disk drive that has the shortest seek time. In order to determine which of the disk drives has the shortest seek time, one of the attributes stored for each logical track in the logical track table could be the track number for the last read or write operation performed by the disk drive. Therefore, the seek time could be determined by the difference between the physical track number of the last data access and the physical track number for the current read operation. Execution continues from step 95 to step 92 where data from the disk is stored in cache memory and then in step 89 the data is returned from the cache memory to the requesting host and processing for the short read operation is done.

For a long read operation, execution branches from step 94 to step 96. In step 96, the storage controller issues read commands to both of the disk drives in the pair containing the desired data to divide the read task between them. For example, one disk drive reads the requested even-numbered physical track or tracks, and the other disk drive reads the requested odd-numbered physical track or tracks. Then execution continues to step 92, where the storage controller stores the data from disk in the cache memory. Finally, in step 89, the storage controller returns the data from cache memory to the requesting host processor, and processing of the long read request is finished.

For accessing continuous media data that has been striped as shown in FIGS. 6A and 6B, it may be desirable to enable the host processors to have more explicit control over whether the storage controller should read data from only one or both of the disk drives that store copies of a data block to be accessed. For example, the host processors could be permitted to set or clear an attribute of a data block to indicate whether a request to read data from the data block should be handled either as described above for a short read request or as described above for a long read request. Alternatively, each read request could include a flag for indicating whether the read request should be handled either as described above for a short read request or as described above for a long read request. Also, a flag could be included in each read request for indicating a particular one of the two disk drive arrays that should be accessed in the absence of a failure of a disk drive storing the data block.

Still another option is to program the storage controller to map three logical volumes to the mirrored array pair. A host processor request to read the first logical volume would be interpreted as a request to read the first disk drive array in the mirrored array pair, or alternatively to read the second disk drive if the first disk drive were inoperative. A host processor request to read the second logical volume would be interpreted as a request to access the second disk drive array in the mirrored array pair, or alternatively to read the first disk drive if the second disk drive were inoperative. A host processor request to read the third logical volume would be interpreted as a request to read data from the disk drive array having the shortest seek time. This option has the advantage of using a conventional read request format.

Figure 10:
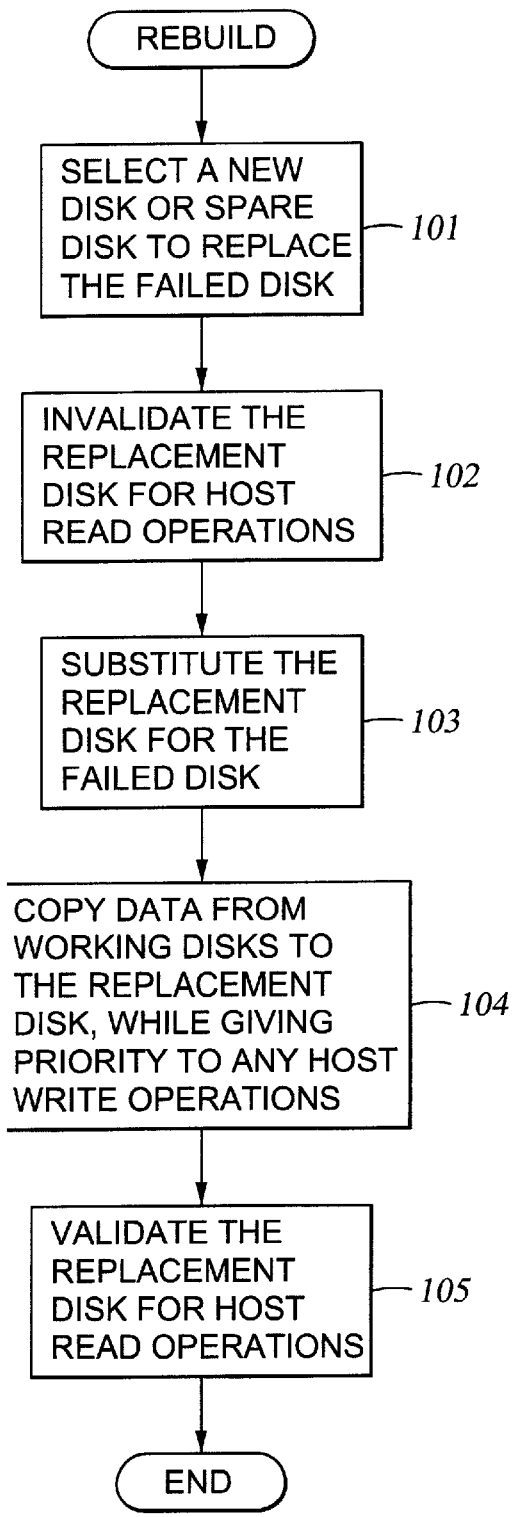
FIG. 10 is a flowchart of programming of the storage controller in FIG. 1 in order to rebuild a mirrored array relationship with respect to a replacement for a failed disk drive.

Turning now to FIG. 10, there is shown a flowchart of a rebuild procedure performed by the service processor 45 when the service processor determines that a disk drive in a mirrored disk array has failed. In a first step 101, the service processor selects a new disk drive or a spare disk drive for replacement of the failed disk drive. In step 102, the service processor invalidates the replacement disk drive for host read operations. However, the replacement disk is valid for host write operations. In step 103 the service processor substitutes the replacement disk for the failed disk in the logical track table (62 of FIG. 7) of the cache index, and also in the mirrored array table (71 of FIG. 8) and in the mapping table (72 of FIG. 8). Then in step 104 the service processor copies data from the working disks in the other array of the mirrored array pair to the replacement disk, while giving priority to any host write operations. It is also possible for the host write operations to validate tracks of the replacement disk so that there is no need for the service processor to copy data to such validated tracks. Once the replacement disk has been filled with data so that the mirrored relationship between the arrays is restored, then in step 105 the replacement disk is validated for host read operations. By using validation attributes in the logical track table (62 of FIG. 7) it is also possible to validate the replacement disk for host read operations on a logical track basis, so that there is no need to delay access to the entire replacement disk for host read operations until data has been copied to the entire replacement disk.

In view of the above, it has been shown that asymmetrical striping of mirrored arrays of data storage devices will solve a failure load problem to ensure continuous throughput for applications such as continuous media and backup copying. The mirrored data contained in a failed storage device in one of the arrays can be accessed by accessing respective shares of this mirrored data in a plurality of the data storage devices in the other array. In addition, the asymmetrical striping reduces the "rebuild" time for copying this mirrored data to a replacement for the failed storage device. The mirrored data can be copied to the failed data storage device from more than one other data storage device without substantial interruption of any continuous throughput.

For disk storage devices, the mirrored data can be arranged in the first and second arrays so that the mirrored data is contained at the same disk track radius in both arrays in order to equalize seek time for write access or sequential read access to both arrays. Alternatively, the mirrored data can be arranged so that mirrored data at the minimum and maximum track radius in one array is contained at the mean track radius of the other array in order to minimize seek time for random read access.

What is claimed is:

1. A data storage system comprising:
   a first array of data storage devices;
   a second array of data storage devices; and
   a storage controller coupled to the first array of storage devices and the second array of storage devices for accessing mirrored data contained in the first array of data storage devices and also contained in the second array of data storage devices, the storage controller being programmed to respond to a request to access a specified portion of the mirrored data by accessing the specified portion of the mirrored data in the first array of data storage devices when the specified portion of the mirrored data cannot be accessed in the second array of data storage devices, and by accessing the specified portion of the mirrored data in the second array of data storage devices when the specified portion of the mirrored data cannot be accessed in the first array of data storage devices; wherein each data storage device in the first array of data storage devices contains a respective share of the mirrored data, each data storage device in the second array of data storage devices contains a respective share of the mirrored data, each data storage device in the second array of data storage devices contains a respective share of the mirrored data contained in said each data storage device in the first array of data storage devices, and each data storage device in the first array of data storage devices contains a respective share of the mirrored data contained in said each data storage device in the second array of data storage devices; wherein the mirrored data contained in the first array of data storage devices and also contained in the second array of data storage devices is subdivided into respective data blocks, each data storage device in the first array of data storage devices contains the same number of the data blocks so that the data blocks are cells in a first matrix, each data storage device in the second array of data storage devices contains the same number of the data blocks so that the data blocks are cells in a second matrix, and the second matrix is the transpose of the first matrix.

2. The data storage system as claimed in claim 1, wherein the data storage devices in the first and second arrays of data storage devices contain rotating disks, and the mirrored data is contained at different radii on the rotating disks, wherein each of the data blocks contained in each of the data storage devices is contained at radii over a respective range of radii on said each of the data storage devices, the data blocks in each row of the first matrix are contained in the data storage devices in the first array of data storage devices at the same range of radii, and the data blocks in each row of the second matrix are contained in the data storage devices in the second array of data storage devices at the same range of radii.

3. The method as claimed in claim 1, wherein the data storage devices in the first and second arrays of data storage devices contain rotating disks, the mirrored data is stored in even and odd numbered circular tracks on planar surfaces of the rotating disks, and the storage controller is further programmed for a read access to the specified portion of the mirrored data by issuing a read command to one of the data storage devices in the first array of data storage devices for reading one half of the specified portion of the mirrored data from odd numbered tracks and by issuing a read command to one of the data storage devices in the second array of data storage devices for concurrently reading another half of the specified portion of the mirrored data from even numbered tracks.

4. A data storage system comprising:

a first array of disk drives;

a second array of disk drives;

a storage controller coupled to the first array of disk drives and the second array of disk drives for accessing mirrored data contained in the first array of disk drives and also contained in the second array of disk drives, the storage controller being programmed to respond to a request to access a specified portion of the mirrored data by accessing the specified portion of the mirrored data in the first array of disk drives when the specified portion of the mirrored data cannot be accessed in the second array of disk drives, and by accessing the specified portion of the mirrored data in the second array of disk drives when the specified portion of the mirrored data cannot be accessed in the first array of disk drives; wherein the mirrored data is subdivided into a plurality of data blocks, each disk drive in the first array of disk drives contains a respective share of the data blocks, each disk drive in the second array of disk drives contains a respective share of the data blocks, said each disk drive in the second array of disk drives contains a respective one of the data blocks contained in said each disk drive in the first array of disk drives, and said each disk drive in the first array of disk drives contains a respective one of the data blocks contained in said each disk drive in the second array of disk drives; wherein said each disk drive in the first array of disk drives contains the same number of the data blocks so that the data blocks in the first array of disk drives are organized according to a first matrix having rows and columns of the data blocks, each row in the first matrix indicating a striping of the data blocks across the disk drives in the first array of disk drives, and each column in the first matrix indicating a striping of the data blocks within a respective one of the disk drives in the first array of disk drives, and so that the data blocks in the second array of disk drives are organized according to a second matrix having rows and columns of the data blocks, each row in the second matrix indicating a striping of the data blocks across the disk drives in the second array of disk drives, and each column in the second matrix indicating a striping of the data blocks within a respective one of the disk drives in the second array of disk drives, wherein the second matrix is the transpose of the first matrix.

5. The data storage system as claimed in claim 4, wherein the first matrix includes four rows and four columns, and wherein the second matrix includes four rows and four columns.

6. The data storage system as claimed in claim 4, wherein the disk drives in the first and second arrays of disk drives contain rotating disks, and each of the data blocks contained in each of the disk drives is contained at radii over a respective range of radii on said each of the disk drives, the data blocks in each row of the first matrix are contained in the disk drives in the first array of disk drives at the same range of radii, and the data blocks in each row of the second matrix are contained in the disk drives in the second array of disk drives at the same range of radii.

7. The method as claimed in claim 4, wherein the disk drives in the first and second arrays of disk drives contain rotating disks, the mirrored data is stored in even and odd numbered circular tracks on planar surfaces of the rotating disks, and the storage controller is further programmed for a read access to the specified portion of the mirrored data by issuing a read command to one of the data storage devices in the first array of data storage devices for reading one half of the specified portion of the mirrored data from odd numbered tracks and by issuing a read command to one of the data storage devices in the second array of data storage devices for concurrently reading another half of the specified portion of the mirrored data from even numbered tracks.

8. A data storage system comprising:

a first array of disk drives;

a second array of disk drives;

a storage controller coupled to the first array of disk drives and the second array of disk drives for accessing mirrored data contained in the first array of disk drives and also contained in the second array of disk drives, the storage controller being programmed to respond to a request to access a specified portion of the mirrored data by accessing the specified portion of the mirrored data in the first array of disk drives when the specified portion of the mirrored data cannot be accessed in the second array of disk drives, and by accessing the specified portion of the mirrored data in the second array of disk drives when the specified portion of the mirrored data cannot be accessed in the first array of disk drives; wherein the mirrored data is subdivided into a plurality of data blocks, each disk drive in the first array of disk drives contains a respective share of the data blocks, each disk drive in the second array of disk drives contains a respective share of the data blocks, said each disk drive in the second array of disk drives contains a respective one of the data blocks contained in said each disk drive in the first array of disk drives, and said each disk drive in the first array of disk drives contains a respective one of the data blocks contained in said each disk drive in the second array of disk drives; wherein said each disk drive in the first array of disk drives contains the same number of the data blocks so that the data blocks in the first array of disk drives are organized according to a first matrix having rows and columns of the data blocks, each row in the first matrix indicating a striping of the data blocks across the disk drives in the first array of disk drives, and each column in the first matrix indicating a striping of the data blocks within a respective one of the disk drives in the first array of disk drives, and so that the data blocks in the second array of disk drives are organized according to a second matrix having rows and columns of the data blocks, each row in the second matrix indicating a striping of the data blocks across the disk drives in the second array of disk drives, and each column in the second matrix indicating a striping of the data blocks within a respective one of the disk drives in the second array of disk drives, wherein the striping as indicated by each row of the first matrix is the same as the striping as indicated by a respective one of the columns of the second matrix.

9. The data storage system as claimed in claim 8, wherein the first matrix includes four rows and four columns, and wherein the second matrix includes four rows and four columns.

10. The data storage system as claimed in claim 8, wherein the disk drives in the first and second arrays of disk drives contain rotating disks, and each of the data blocks contained in each of the disk drives is contained at radii over a respective range of radii on said each of the disk drives, the data blocks in each row of the first matrix are contained in the disk drives in the first array of disk drives at the same range of radii, and the data blocks in each row of the second matrix are contained in the disk drives in the second array of disk drives at the same range of radii.

11. The method as claimed in claim 8, wherein the disk drives in the first and second arrays of disk drives contain rotating disks, the mirrored data is stored in even and odd numbered circular tracks on planar surfaces of the rotating disks, and the storage controller is further programmed for a read access to the specified portion of the mirrored data by issuing a read command to one of the data storage devices in the first array of data storage devices for reading one half of the specified portion of the mirrored data from odd numbered tracks and by issuing a read command to one of the data storage devices in the second array of data storage devices for concurrently reading another half of the specified portion of the mirrored data from even numbered tracks.

* * * * *